(12) United States Patent
Kelley et al.

(10) Patent No.: US 8,209,865 B2
(45) Date of Patent: Jul. 3, 2012

(54) METHOD OF MANUFACTURING AIRCRAFT USING TEMPORARY FASTENERS

(75) Inventors: James A. Kelley, Benbrook, TX (US); Rick A. Luepke, Fort Worth, TX (US); Lisa M. Vestal, Fort Worth, TX (US); Elizabeth J. Kush, Fort Worth, TX (US); Michael Loren Hestness, Fort Worth, TX (US); Eric C. Patty, Wauseon, OH (US); Jeff Langevin, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 659 days.

(21) Appl. No.: 12/478,596

(22) Filed: Jun. 4, 2009

(65) Prior Publication Data

US 2010/0308171 A1 Dec. 9, 2010

(51) Int. Cl.
*B21D 39/00* (2006.01)
*B23P 11/00* (2006.01)
*F16B 13/06* (2006.01)

(52) U.S. Cl. ... 29/897.2; 29/424; 29/525.01; 29/525.02; 29/525.11; 411/57.1

(58) Field of Classification Search ............. 29/424, 29/525.01, 525.02, 525.11, 897.2, 522.1; 411/57.1
See application file for complete search history.

(56) References Cited

U.S. PATENT DOCUMENTS

| | | | |
|---|---|---|---|
| 3,426,399 A | 2/1969 | Jones | |
| 4,370,081 A | 1/1983 | Briles | |
| 4,548,533 A | 10/1985 | Pratt | |
| 4,610,587 A | 9/1986 | Wollar et al. | |
| 4,783,228 A | 11/1988 | Aker et al. | |
| 4,878,791 A | 11/1989 | Kurihara et al. | |
| 4,934,885 A | 6/1990 | Woods et al. | |
| 4,979,281 A | 12/1990 | Smith et al. | |
| 5,030,051 A | 7/1991 | Kaneko et al. | |
| 5,927,919 A | 7/1999 | Blankenship et al. | |
| 6,088,897 A | 7/2000 | Banks et al. | |
| 6,134,940 A | 10/2000 | Banks et al. | |
| 6,158,666 A | 12/2000 | Banks et al. | |
| 6,172,374 B1 | 1/2001 | Banks et al. | |
| 6,210,084 B1 | 4/2001 | Banks et al. | |
| 6,302,630 B1 | 10/2001 | Grant | |
| 2005/0025602 A1 | 2/2005 | Huang | |
| 2006/0170142 A1 | 8/2006 | Scapa | |
| 2008/0216292 A1 | 9/2008 | Rudduck et al. | |

*Primary Examiner* — Jermie Cozart
(74) *Attorney, Agent, or Firm* — Bracewell & Giuliani LLP

(57) ABSTRACT

A temporary fastener and a method of attaching an aircraft skin to a frame using the temporary fastener during a step of the skin to frame assembly process. The fastener secures the skin to the structure while holes for permanent fasteners are drilled through the skin and frame; the fastener is flush mounted so that an automatic drill can drill the holes without interference. The temporary fastener can be removed after the permanent fastener holes are drilled, and before or after permanent fasteners are inserted within their respective holes.

12 Claims, 3 Drawing Sheets

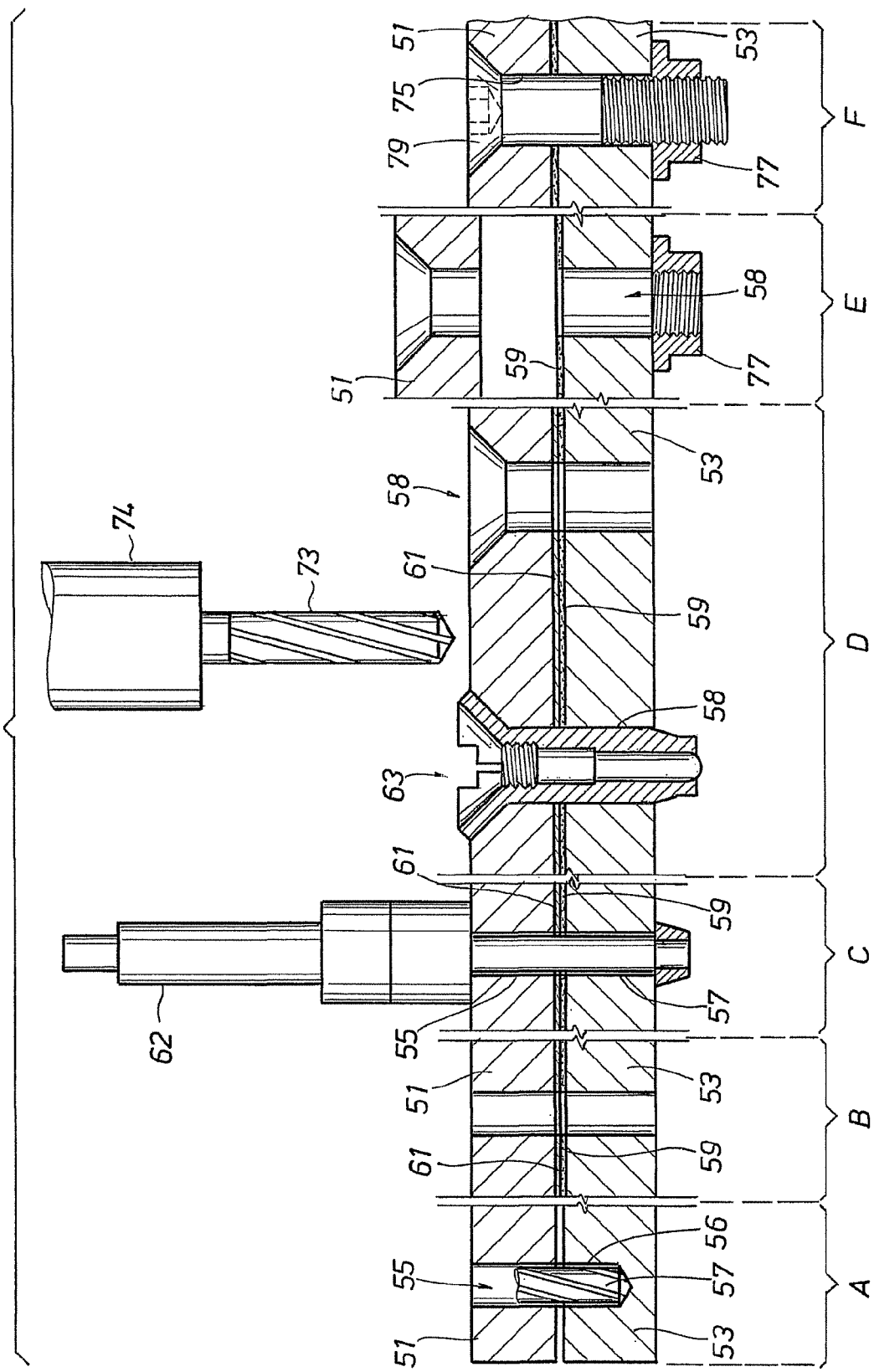

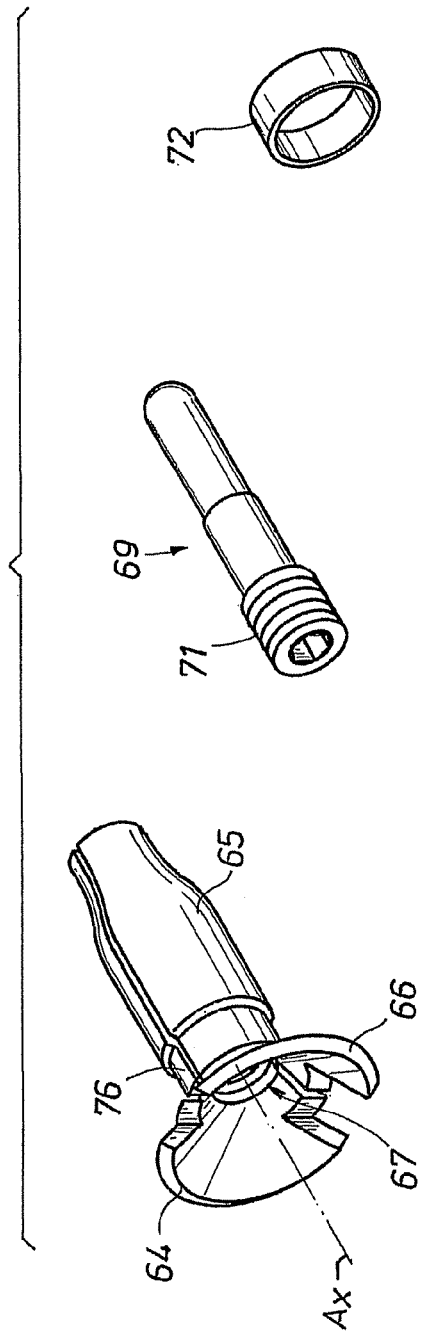
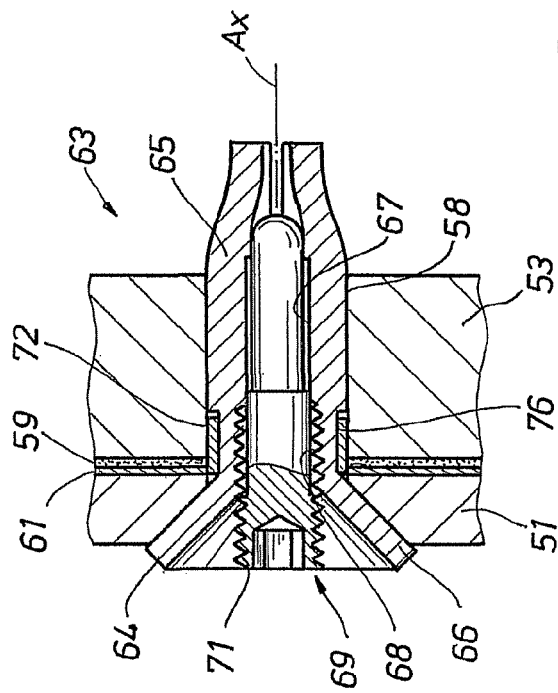
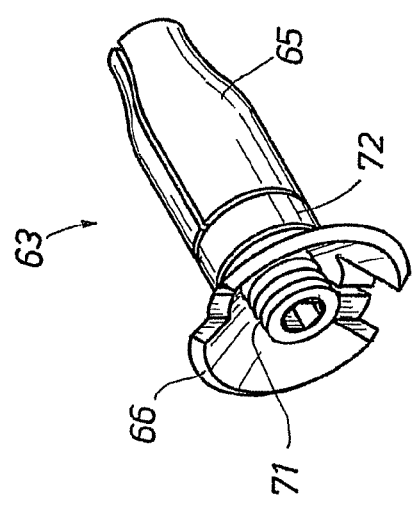

METHOD OF MANUFACTURING AIRCRAFT USING TEMPORARY FASTENERS

BACKGROUND

1. Field of Invention

The present disclosure relates generally to a method of affixing together an aircraft skin and frame. More specifically, the present disclosure concerns coupling an aircraft skin and frame with a temporary fastener dining a step of assembly and removing the fastener

2. Description of Prior Art

Much of the external surface of an aircraft is formed by applying a skin and anchoring it over an underlying substrate, such as a structure. When using mechanical fasteners to attach an outer skin to a rib or other structure, a liquid shim is typically applied between the structure and skin to eliminate gaps or other differences between the two parts. Multiple fasteners are also typically inserted through the skin and underlying structure to further eliminate any gaps between the skin and the structure. FIG. 1 schematically represents in a partial side sectional view a series of steps that may be used when applying an aircraft skin to a structure. Sequential steps are represented adjacent one another and identified with one of identifier letters A-F and a respective curved bracket. Step A depicts the skin 11 positioned over the structure 13 and aligned with preset index pins (not shown). A drill 16 is inserted through the skin 11 via a pilot hole 15 for forming a transfer hole 17 into the underlying structure 13. A section of skin 11 and corresponding structure 13 may include multiple pilot and transfer holes 15, 17.

After the transfer holes 17 are formed within the structure 13 the skin 11 may be lifted from the structure 13 and then a mask 21 applied to the skin and a shim material 19 applied onto the structure 13 on its surface on which the skin 11 is attached. The mask 21 can be used for preventing the shim material from attaching to the skin 11 and pre-securing it to the structure 13. The skin 11 with a film mask 21 and structure 13 with an applied shim 19 is represented in step B. In step C, a clamp 23 is shown inserted into the corresponding pilot and transfer holes 15, 17. As shown, the clamp 23 includes a shaft with a tip at one end having a width greater than the hole 15, 17 diameter, thus preventing the shaft from moving further upward. The clamp 23 also includes a mandrel shown secured around the shaft for compressing together the skin 11 and structure 13. Depending on the number of pilot and transfer holes 15, 17; a clamp 23 may be provided in every fourth or fifth hole. The compressive force squeezes out and extrudes excess shim 19 material that may have been present on the structure 13. Depending on the shim 19 material, a period of time is required for it to cure before the clamp 23 can be removed. After removing the clamp 23, a full-size drill (not shown) is used to bore out the transfer and pilot holes 15, 17 to create a full-sized bore 18 extending through the skin 11 and structure 13.

In step D, a full-sized clamp 25 is inserted within the full-sized bore 18 and compressive pressure again applied to the skin 11 and structure 13 to remove yet more shim 19 material. The full-sized clamp 25 can be removed after further curing of the shim 19 material. The skin 11 is taken away from the structure 13 and the mask 21 removed from the skin 11. In step E, a nut 27 is attached on the undersurface of the structure 13 and a setup bolt 29 is inserted within the bore 18 threadingly fastened to the nut 27. This provides an attachment force between the skin 11 and structure 13 so that an automatic drill 31 with associated drill bit 33 can automatically bore additional holes 35 through the skin 11 and structure 13. Clamps 25 are replaced with the setup bolts 29 prior to auto-drill because their size interferes with the drilling process.

In step F, additional nuts 27 are secured to the structure 13 bottom side. The skin 11 and structure 13 can be permanently attached by inserting permanent bolts 37 through the additional holes 35 and mating with the bolts 37. It should be pointed out that the clamp 25 is removed and replaced with the temporary setup bolt 29 to allow the automatic drill assembly to move unobstructed on the skin 11 surface.

The liquid shim 19 is allowed to harden before drilling full-size holes for setup bolts 29, which usually takes six to eight hours but requires the skin 11 to be removed to install setup bolts 29. Although drilling operations can begin after the six- to eight-hour cure, the risk associated with removing the skin 11 before the shim 19 has cured for twenty-four hours is too great. Therefore, practice typically requires that a full twenty-four hours of curing take place before the skin 11 can be removed to allow setup bolt 29 installation.

SUMMARY OF INVENTION

Disclosed herein is a method of aircraft assembly that includes positioning an aircraft skin onto an aircraft frame, boring a first hole through the skin and frame, coupling the skin and frame by inserting a temporary fastener within the first hole that radially expands a portion of the temporary fastener. This applies a radial force to grip the portion of the first hole within the frame, boring additional holes through the skin and frame, and removing the temporary fasteners and inserting permanent fasteners through the additional holes and the hole previously occupied by the temporary fastener to permanently attach the skin to the frame.

Also disclosed herein is a method of attaching an aircraft skin to a frame that includes aligning the skin with the structure, forming an attachment hole through the skin and structure by boring a transfer hole in the structure that aligns with a pilot hole in the skin, applying a liquid shim material to the structure, clamping together the skin and structure, providing an elongated temporary fastener having a radially expandable body and a head with a diameter that is greater than the diameter of the pilot hole, inserting the temporary fastener into the attachment hole and expanding the body to engage the structure, forming additional attachment holes in the structure, removing the temporary fastener, and bolting a permanent fastener into the attachment hole.

Further disclosed herein is a temporary fastener having a cylindrically shaped barrel, a frusto-conical head on an end of the barrel, a bore along the barrel axis having a diameter that tapers lower at a distance away from the head, threads on a portion of the bore wall proximate the head, and a set screw having a shaft portion having a diameter up to about the bore diameter proximate the bore threads and a threaded portion engageable with the bore threads, so that inserting the shaft into the bore to where the bore diameter tapers lower expands the barrel radially outward and engages the bore and screw threads to retain the screw within the bore.

BRIEF DESCRIPTION OF DRAWINGS

Some of the features and benefits of the present invention having been stated, others will become apparent as the description proceeds when taken in conjunction with the accompanying drawings, in which:

FIG. 2 schematically represents steps of an embodiment of the present method of attaching an aircraft skin to a frame.

FIG. 3 provides side perspective views of temporary fastener components.

FIG. 4 depicts a side perspective view of the temporary fastener components FIG. 3 assembled into a temporary fastener.

FIG. 5 is a sectional view the temporary fastener of FIG. 4.

Figure 1:
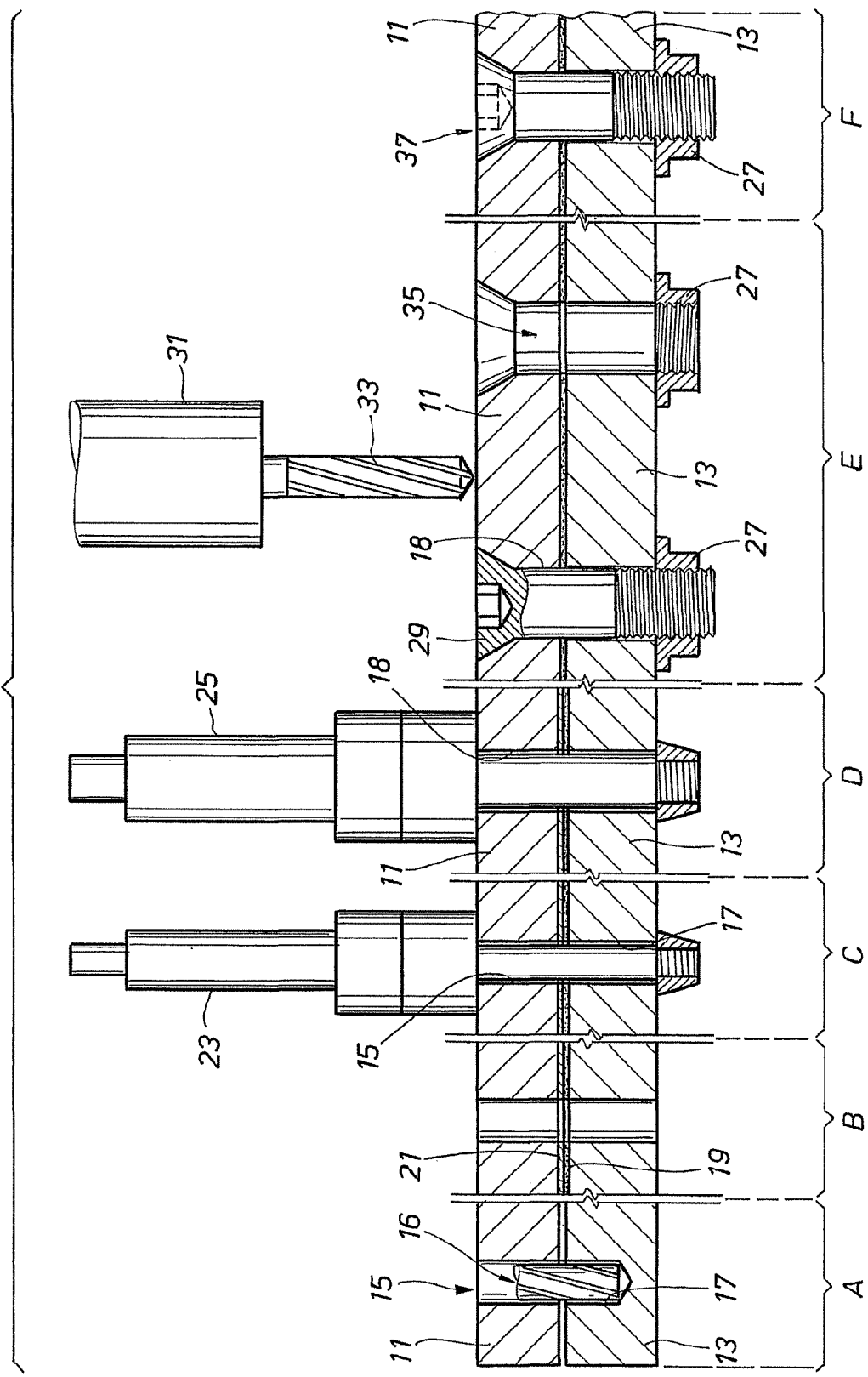
FIG. 1 schematically represents prior art steps of attaching an aircraft skin to a frame.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The device, system, and method of the present disclosure will now be described more fully hereinafter with reference to the accompanying drawings in which disclosed embodiments are shown. The disclosed subject matter may, however, be embodied in many different forms and should not be construed as limited to the illustrated embodiments set forth herein; rather, these embodiments are provided so that this disclosure will be through and complete, and will fully convey the scope of the invention to those skilled in the art. Like numbers refer to like elements throughout.

It is to be understood that the device, system, and/or method described herein is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation. Accordingly, the subject of applicant's disclosure is therefore to be limited only by the scope of the appended claims.

Example steps of a method for applying an aircraft skin to an underlying structure are shown in a schematic partially side-sectional view in FIG. 2. Sequential process steps A-F are shown adjacent one another and identified with letter call outs and respective curved brackets. Shown in step A skin 51 is aligned with a structure 53 along index pins (not shown); a drill 56 inserted through a pilot hole 55 in the skin 51 bores a corresponding transfer hole 57 in the structure 53. In adjacent step B, a mask film 61 has been applied to the skin 51 under surface and shim 59 onto the structure 53 upper surface. In step C a clamp 62 is inserted through the pilot and transfer holes 55, 57 to compress the skin 51 and structure 53 for forcing excess shim 59 material from between the skin and structure 51, 53.

The shim 59 material is given time to cure and then the clamp 62 can be removed. A temporary fastener 63 is then inserted through the pilot and transfer holes 55, 57. Optionally, a contoured bore 58 can be formed to match the temporary fastener 63 shape. As will be described in further detail below, the temporary fastener 63 includes an outer housing that may be segmented and an inner shaft engageable with a bore in the housing. Corresponding threads may be provided within the housing bore and the shaft. The fastener 63 can be activated to couple the skin 51 and structure 53 by inserting the shaft within the bore to expand the housing thereby applying a retaining force to the skin 51 and structure 53. While the temporary fastener 63 is in place, as shown in step D, an automatic drill assembly 74 can be used to form additional bores 75 through the skin 51 and structure 53. In the embodiment of FIG. 2, the temporary fastener 63 is flush mounted so that its upper end is substantially at the skin 51 surface thereby allowing the automatic drill assembly 74 to negotiate freely over the skin 51 without fastener 63 interference.

In step E, after removing temporary fasteners 63, the skin 51 is depicted lifted from the structure 53 for removing its underlying mask film 61. Also shown in step E, nuts 77 are applied on the structure 53 undersurface. Threaded bores in the nuts 77 register with the bore 75. Subsequently in step F the skin 51 is set onto the structure 53 surface over the shim material 59. A permanent fastener 79 is then inserted through the additional hole 75 and into engagement with threads formed within the nut 77.

FIG. 3 provides a side perspective view of example components of a temporary fastener 63. The fastener 63 can include a segmented housing 66 with a head 64 having a frusto-conical recess at an end with a cylindrical barrel 65 depending coaxially from the head 64. The frusto-conical head 64 and barrel 65 circumscribe an axis $A_x$. The housing 66 further includes an axial bore 67 that runs along the axis $A_x$ from within the head 64 and into the barrel 65. The segmented configuration of the housing 66 allows it to expand in response to forces applied within the bore 67 that project radially outward. Also provided in a perspective view in FIG. 3 is an example of a set screw 69. The set screw 69 is a substantially elongated member having threads 71 along a portion of its body and a shaft 70 protruding axially away from the end of the threads 71. An annular collar 72 is also shown that fits along a groove 76 formed circumferentially around the barrel 65 adjacent to the head 64. An assembled example of a temporary fastener 63 is depicted in perspective view in FIG. 4. In this example, the retaining collar 72 is disposed within the groove 76 and the set screw 69 is shown inserted into the bore 67 with the threaded portion 71 just within the frusto-conical section of the housing 66.

A side sectional view of an example of the temporary fastener 63 is shown in FIG. 5. Here, the set screw 69 is inserted within the bore 67. Threads 71 on the set screw 69 engage threads 68 formed on the bore 67 outer circumference. As noted above, the segmented housing 66 increases its circumference in response to outward radial forces. In FIG. 5, the bore 67 tapers inward towards its end opposite the head 64. The shaft 69 dimensions exceed the bore's 67 tapered portion dimensions, thus inserting the shaft 69 within the tapered portion provides the above mentioned outward radial forces. As shown in FIG. 5, the outward radial forces compress the barrel 65 between the shaft 70 and structure 53 thereby coupling the fastener 63 to the structure 53. The frusto-conical head 64 prevents the fastener 63 from being pushed through the skin 51. Thus coupling the barrel 65 to the structure 53 fastens the skin 51 to the structure 53. Moreover, an axial force pushing the set screw 69 into the segmented body 66 can spread apart the segments enabling the threads 72 on the screw 69 to engage threads 68 in the bore 67 and retain the set screw 69 within the housing 66. Similarly, rotating the screw 69 so it backs out from the bore 67 from interaction between the threads 68, 72, allows the barrel 65 to retract and decouple from the structure 53 so the body 66 is removable from the structure 53.

Using a temporary fastener allows the clamps to be removed after the six- to eight-hour shim cure and installed in place of the clamps. This can allow the auto-drill operations to occur up to fifteen to twenty hours earlier than normal since the skin is not required to be removed for installing a temporary fastener. This can also eliminate extra operation of skin removal for installing set up bolts.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A method of aircraft assembly comprising:
 positioning an aircraft skin onto an aircraft frame;
 boring a first hole through the skin and frame;
 coupling the skin and frame by inserting a temporary fastener within the first hole radially expanding a portion of the temporary fastener to apply a radial force to grip the portion of the first hole within the frame;
 boring additional holes through the skin and frame; and
 removing the temporary fasteners and inserting permanent fasteners through the additional holes and the hole previously occupied by the temporary fastener to permanently attach the skin to the frame.

2. The method of claim 1, wherein inserting permanent fasteners comprises bonding nuts to the frame opposite the holes.

3. The method of claim 1, further comprising applying a pliable shim material between the skin and frame before installing the temporary fastener.

4. The method of claim 3, further comprising compressing the skin and frame with a clamp to force excess shim material from between the skin and frame before installing the temporary fastener.

5. The method of claim 4, further comprising applying a mask film to the skin on its side facing the structure before applying the shim material and removing the mask film after removing the temporary fastener and prior to affixing the skin and frame with a permanent fastener.

6. The method of claim 4, further comprising removing the clamp before boring the additional holes.

7. The method of claim 1, wherein the temporary fastener includes a segmented annular body having an axial bore, threads within the bore, a shaft insertable within the bore, and threads on the shaft engageable with the threads within the bore.

8. The method of claim 1, wherein the temporary fastener has a head that is substantially flush with the skin when installed.

9. A method of attaching an aircraft skin to a frame comprising:
 a. aligning the skin with the structure;
 b. forming an attachment hole through the skin and structure by boring a transfer hole in the structure that aligns with a pilot hole in the skin;
 c. applying a liquid shim material to the structure;
 d. clamping together the skin and structure;
 e. providing an elongated temporary fastener having a radially expandable body and a head with a diameter that is greater than the diameter of the pilot hole;
 f. inserting the temporary fastener into the attachment hole and expanding the body to engage the structure;
 g. forming additional attachment holes in the structure;
 h. removing the temporary fastener; and
 i. bolting a permanent fastener into the attachment hole.

10. The method of claim 9, further comprising adding a mask film to the skin bottom surface prior to step (d) and removing the mask film prior to step (i).

11. The method of claim 9, wherein the temporary fastener head has a frusto-conical cross section, the method further comprising tapering the skin pilot hole to match the fastener head frusto-conical shape so that the temporary fastener is flush mounted in the skin.

12. The method of claim 9, wherein steps (f) and (g) occur while the shim material is being cured.

* * * * *